Feb. 23, 1965 J. C. MILLER 3,171,038

FAST HIGH CURRENT DRIVER USING TUNNEL DIODES

Filed Aug. 19, 1960

INVENTOR.
JAMES C. MILLER.
BY
H. L. Gordon
AGENT.

United States Patent Office 3,171,038
Patented Feb. 23, 1965

3,171,038
FAST HIGH CURRENT DRIVER USING TUNNEL DIODES

James C. Miller, Hamilton Square, N.J., assignor, by mesne assignments, to the United States of America as represented by the Secretary of the Navy Filed Aug. 19, 1960, Ser. No. 50,812
8 Claims. (Cl. 307—88.5)

This invention relates to a method and apparatus for obtaining high power, output pulses that are only a few nanoseconds long; and more particularly relates to a fast, high current driver circuit using tunnel diodes.

One of the most promising devices for use with high speed digital computers is the tunnel diode as described by L. Esaki in "The Physical Review," vol. 109, of January 15, 1958, pages 603 and 604. A purpose of this invention is to utilize such devices for providing a driver circuit of high power but capable of producing a series of very short duration pulses.

An object of this invention is, therefore, to provide a fast pulse, high current, and high voltage driver circuit.

Another object of this invention is to provide a driver circuit using a plurality of tunnel diodes for obtaining high power pulses.

Still another object of this invention is to provide a high power pulse driver circuit using a plurality of tunnel diodes having means whereby the length of the pulse may be varied as desired.

A further object of this invention is to provide a monostable tunnel diode driver circuit requiring only a single triggering pulse.

A still further object of this invention is to provide a bistable tunnel diode driver circuit which may be driven at a very high pulse repetition rate.

Other objects and many of the attendant advantages of this invention will be readily appreciated as the same becomes better understood by reference to the following detailed description when considered in connection with the accompanying drawings wherein.

In the graphs of the figures the abscissa represents volts and the ordinate represents milliamps output resulting from the application of a voltage across the typical tunnel diode or of the driver circuits to which the particular figures are directed.

Figures 1, 2, 3:
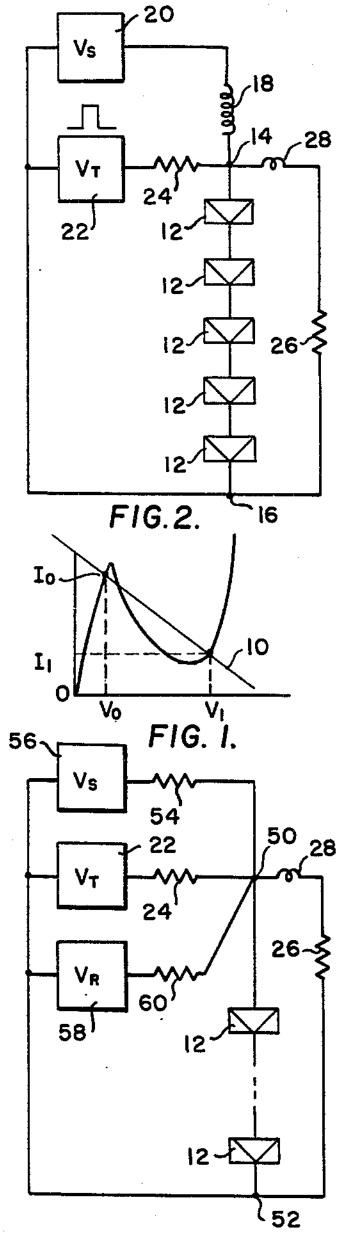
FIG. 1 is a graph of a characteristic curve of a typical tunnel diode.
FIG. 2 is a schematic diagram of a monostable tunnel diode driver circuit in accordance with the invention.
FIG. 3 is a schematic diagram of a bistable tunnel diode driver circuit in accordance with the invention.

It may be helpful to an understanding of the invention to discuss a typical characteristic curve of a tunnel diode. Such a curve is shown in FIG. 1. It will be observed that the typical tunnel diode has a low positive resistance in the first portion of the characteristic curve from 0 to about $V_0$, the current rising with increased voltage. In the portion between substantially $V_0$ and $V_1$ the current falls with increased voltage so the diode has a negative resistance in this portion of its operation. The diode then assumes a positive resistance when the voltage across it is higher than $V_1$, because the current again rises with increased applied voltage. The initial point of inflection or turning point, roughly indicated at $I_0$, may vary from less than a milliampere to an ampere or more in the typical tunnel diode, while a value of the voltage above the second point of inflection, roughly $V_1$ in FIG. 1, is relatively constant. The current rises almost vertically with increased voltage beyond $V_1$ which is on the order of slightly less than ½ volt.

In FIG. 1 a typical load line 10 intersects the characteristic curve at $I_0$ and $I_1$. At $I_0$ the diode assumes a low voltage-high current state relative to the low current-high voltage state at $I_1$. When the tunnel diode is used in the arrangement of FIG. 1, the current output is $I_0—I_1$, and the voltage output is $V_0—V_1$. The relatively constant portion of the higher voltage value thus severely limits the power output and use of a single tunnel diode driver circuit. In the preferred form of the invention, driver circuits are provided which have a high voltage output and which maintain the high current output in the operational range.

Referring to FIG. 2, a preferred embodiment of a monostable driver circuit is shown wherein a plurality of tunnel diodes 12 are connected in series between output terminals 14 and 16. All of the diodes are biased in the forward direction through a relatively large inductance 18 from a voltage source $V_s$, indicated by the reference numeral 20.

In order to switch the drive circuit, a switching means in the form of a voltage trigger source $V_t$, given the reference numeral 22, is connected through a trigger resistor 24 to terminal 14 which therefore also serves as an input terminal. The trigger voltage, when energized, triggers the series diode branch circuit from the low biased voltage to a higher voltage state.

An output load for the driver circuit is represented by resistor 26 connected through a decoupling inductance 28 across the output terminals 14 and 16.

Figure 4:
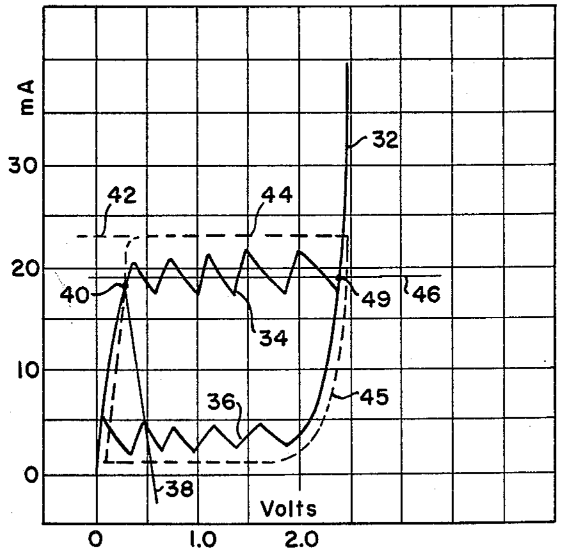
FIG. 4 is a graph of the current-voltage characteristic of the high voltage driver circuits of FIGS. 2 and 3.

FIG. 4 is a graph of a characteristic curve of the circuit of FIG. 2. It will be observed that this characteristic curve has two branches 34 and 36 connected in parallel and terminating in a rising characteristic portion indicated at 32. The composite diode branch has the characteristic of the intersection of 0—0, 40, 34, and 32 when the applied voltage is increasing. When, however, the voltage is decreasing from a point on the portion 32, the characteristic follows the line 32, 49, 36, and the intersection of 0—0. Voltage source $V_s$ in the monostable circuit may be a low voltage (½ volt) and a very low resistance load line 38, which may be the internal resistance of the source 20 and any resistance of inductor 18, biases the driver to 40 in the high current-low voltage state.

If a pulse input from trigger source $V_t$ having a current amplitude equal to the current difference between 40 and 42 is applied through triggering resistor 24 to input terminal 14, the monostable circuit will switch as shown by dotted line 44 up to the high voltage line 32 and a high voltage pulse will be provided across the load resistor 26. Inductor 18 stores sufficient energy during the pulse period so that it will take a relatively appreciable time for the current to decrease from a value near 42 down around the lower portions of the curve 36 and eventually back to original point 40 as indicated by dotted line 45. The trigger current pulse from $V_t$ must be large enough so that the sum of the biasing current and trigger current is larger than any one of the peaks in a composite characteristic curve 34.

Figure 5:
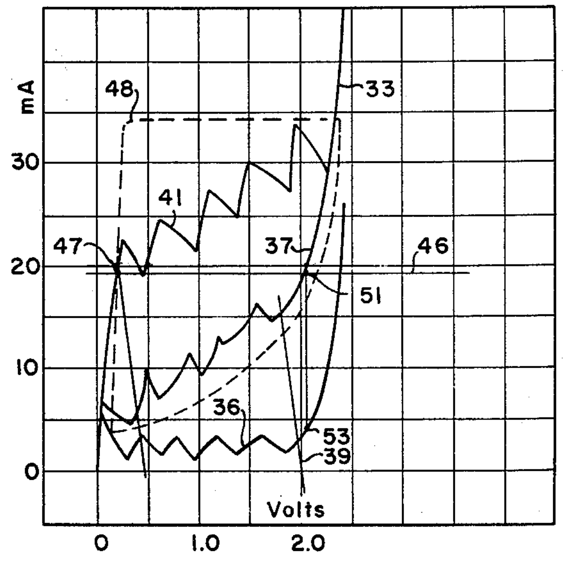
FIG. 5 is a current-voltage graph of the tunnel diode driver circuits showing the effects of the output load.

If a load resistance is connected to output terminal 14, the effect is shown graphically in FIG. 5 where the lower portion of the curve 36 shifts up to line 37 and the upper portion 34 shifts up to line 41. The high impedance portion 33 eventually becomes much greater than load 26 and approaches the value of 32 in FIG. 4. In order for all the diodes 12 to switch as indicated by the peaks in curve 41, the triggering current pulse from 47 to 48 must be much larger, either equal to or greater than the amplitude of the biasing pulse, requiring a prohibitive increase in triggering current and power.

In order to minimize triggering power, the decoupling inductance 28 is connected between output terminal 14 and load resistor 26. If the value of the inductive time constant of inductance 28 and load resistor 26 is equal to or greater than the switching time of the lightly loaded driver circuit, the output load 26 is effectively decoupled or isolated from the driver circuit and allows low power trigger pulses as indicated in FIG. 4 by the difference between 40 and 42. After the circuit has switched, inductance 28 will collapse to allow the load current (the difference between curves 36 and 37 on load line 39 on FIG. 5) to go through resistor 26.

The pulse time of the monostable circuit is determined by the value of inductance 18, the load resistance 26, and the minimum or valley current of the diodes 12. The current decrease in inductance 18 during the switching time along curve 36 must have time to increase to point 40 so that a small recovery time is required for the monostable circuit. In order to minimize this recovery time for extremely fast circuits, a bistable tunnel diode driver circuit is shown in a preferred embodiment in FIG. 3 where a plurality of tunnel diodes 12 are connected between output terminals 50 and 52. While load resistance 26, isolating inductor 28, trigger source 22, and triggering resistor 24 may be similar to those shown in FIG. 2, a relatively large biasing resistance 54 is connected between terminal 50 and a relatively large voltage source 56.

Load line 46 on FIG. 4 indicates a typical load line for the bistable circuit as biased for a zero output at 40. A trigger pulse from voltage trigger 22 applied through triggering resistor 24 switches the bistable circuit from the low state at 40 to the high state at 49. Since the voltage source 56 is a high voltage which does not decrease with time as in the case of the monostable circuit, the circuit remains at point 49 until reset. As shown in FIG. 5, the effect of load 26 is to shift point 49 to point 51 so that the actual diode 12 current is from 0 to 53 while the load current is equal to 51 minus 53. Inductance 28 serves the same function of isolating the load resistance 26 during the switching pulse or time. The bistable circuit will remain in the high state as long as desired and a negative reset pulse from voltage source 58 applied through reset resistor 60 then returns the circuit to the low voltage state at 40. Since the only time constant associated with the bistable circuit is that associated with inductance 28 and the equivalent resistance of the whole circuit, only a very short recovery time is required.

While the preferred embodiments of the driver circuits are as shown in FIGS. 2 and 3, an example of the typical values for a 20 milliampere tunnel diode circuit is as follows:

| | |
|---|---|
| Inductance **18** | 1 microhenry. |
| Voltage source **20** | ½ volt. |
| Resistors **24** and **26** | 200 ohms. |
| Inductance **28** | 50 milli-micro-henries. |
| Resistor **54** | 500 ohms. |
| Voltage source **56** | 10 volts. |
| Resistor **60** | 500 ohms. |
| Diodes **12** | RCA germanium tunnel diodes. |

The circuits as shown deliver a 14 milliampere pulse, 7 nanoseconds wide with an amplitude of about 2.1 volts.

These circuits can of course be used with higher current diodes of ½ to 1 ampere or more. However, the higher current diodes usually have a longer switching time so that, for a particular application, it may be more desirable to use a higher voltage output and lower current output to provide a faster switching time or shorter pulse duration time. The circuits as thus described provide a high voltage, high current output pulse suitable for very high speed operation within the limitations, particularly voltage, of the tunnel diodes.

Obviously many modifications and variations of the present invention are possible in the light of the above teachings. It is therefore to be understood that within the scope of the appended claims the invention may be practiced otherwise than as specifically described.

What is claimed is:

1. A fast, high current driver circuit using tunnel diodes comprising a plurality of tunnel diodes connected in series between an input terminal and an output terminal, an impedance, a power source circuit connected through said impedance to said input terminal, an output load connected between said input and output terminals, means connected to said input terminal for switching said tunnel diodes whereby a relatively high voltage, high current output may be delivered to said load, and decoupling means comprising an inductance connected between said terminals and said load for decoupling said load from said driver circuit during a switching operation whereby low power trigger pulses may be used for switching.

2. A fast, high current driver circuit using tunnel diodes comprising a plurality of tunnel diodes connected in series between an input terminal and an output terminal, an impedance, a power source circuit connected through said impedance to said input terminal, an output load connected between said input and output terminals, means connected to said input terminals for switching said tunnel diodes whereby a relatively high voltage, high current output may be delivered to said load, means connected between said terminals and said load for decoupling said load from said driver circuit during a switching operation whereby low power trigger pulses may be used for switching, and wherein the time constant of said decoupling means and said load are of the same order of magnitude as the switching time of said tunnel diode driver circuit.

3. A fast, high current driver circuit according to claim 2 and further characterized by said impedance comprising an inductance whereby said driver circuit is monostable.

4. A fast, high current driver circuit according to claim 2 and further characterized by said impedance comprising a resistor whereby said driver circuit is bistable.

5. A fast, high current driver circuit according to claim 4 and further characterized by means connected to said input terminal for resetting said bistable circuit.

6. A fast, high current driver circuit according to claim 2 and further characterized by said diodes comprising at least two tunnel diodes biased in the forward direction whereby the voltage output is proportional to the sum of the high voltage states of the diodes.

7. A fast, high current driver circuit for tunnel diodes comprising at least three tunnel diodes able to switch between two stable states connected in series between an input terminal and an output herminal, means adapted to connect an output load between said input and output terminals, a decoupling inductance connected between said input terminal and said output load connecting means, the inductive time constant of said decoupling inductance and load being equal to or greater than the switching time of said diodes, a biasing inductor having one end connected to said input terminal and the other end adapted to be connected to a low voltage source for biasing said diodes in the forward direction, and means connected to said input terminal for switching said diodes from a low voltage state to a voltage state relatively higher than said low voltage state whereby a high power output pulse may be provided for said load.

8. A fast, high current driver circuit for tunnel diodes comprising an input terminal and an output terminal, at least three tunnel diodes able to switch between two stable states connected in series between said terminals, connecting means for connecting an output load between said input and output terminals, a decoupling inductance connected between said input terminal and said output load connecting means, the inductive time constant of said decoupling inductance and load being equal to or greater than the switching time of said diodes, a biasing resistor having one end connected to said input terminal and the other end adapted to be connected to a high voltage source for biasing said diodes in the forward direction, means connected to said input terminal for switching said diodes from a low voltage state to a high voltage state whereby a high power output may be provided to said load, and means connected to said input terminal for switching said diodes from said high voltage state back to said low voltage state.

References Cited by the Examiner

UNITED STATES PATENTS

| | | | |
|---|---|---|---|
| 2,953,754 | 9/60 | Roesel | 331—113 |
| 2,969,494 | 1/61 | Davis | 307—88.5 |
| 2,997,604 | 8/61 | Shockley | 307—88.5 |

FOREIGN PATENTS

| | | |
|---|---|---|
| 1,179,248 | 5/59 | France. |

OTHER REFERENCES

Pub. I, "The Tunnel Diode as a Logic Element," by Lewin et al., from 1960 International Solid-State Circuits conference, Feb. 10, 1960 (pages 10 and 11).

Pub. II, "Esaki (Tunnel)-Diode Logic Circuits," by Neff et al. from same publication as Pub. I), pages 16 and 17.

Pub. III, "Germanium and Silicon Tunnel Diode-Design, Operation, and Applicant," by Lesk et al., in I.R.E. Wescon Convention record, vol. 3, part 3, page 24, August 21, 1959.

ARTHUR GAUSS, *Primary Examiner.*

HERMAN KARL SAALBACH, *Examiner.*